United States Patent [19]

Gilmore et al.

[11] Patent Number: 5,351,809
[45] Date of Patent: Oct. 4, 1994

[54] MULTIPLE-STAGE EXTENDABLE CONVEYOR

[75] Inventors: Phillip J. Gilmore, Healdsburg; Richard J. Micheletti, Sebastopol, both of Calif.

[73] Assignee: Rapistan Demag Corporation, Grand Rapids, Mich.

[21] Appl. No.: 54,106

[22] Filed: Apr. 26, 1993

[51] Int. Cl.⁵ ............................................. B65G 21/14
[52] U.S. Cl. ................................... 198/812; 198/594
[58] Field of Search .................... 198/588, 594, 812

[56] References Cited

U.S. PATENT DOCUMENTS

| | | |
|---|---|---|
| 1,041,439 | 10/1912 | Dearborn . |
| 1,249,239 | 12/1917 | Suffolk . |
| 1,343,799 | 6/1920 | Trefren . |
| 2,166,447 | 7/1939 | Ruppenthal . |
| 2,815,849 | 12/1957 | Zumbrunnen . |
| 3,127,978 | 4/1964 | Zuercher . |
| 3,228,516 | 1/1966 | Sheehan . |
| 3,305,220 | 2/1967 | Nevulis . |
| 3,402,805 | 9/1968 | Spellman, Jr. . |
| 3,613,866 | 10/1971 | Arndt . |
| 3,826,353 | 7/1974 | Greasley . |
| 3,835,980 | 9/1974 | Brooks, Jr. . |
| 3,945,484 | 3/1976 | Oury . |
| 4,312,540 | 1/1982 | Thompson . |
| 4,392,573 | 7/1983 | Gyomrey . |
| 4,406,375 | 9/1983 | Hockensmith . |
| 4,425,069 | 1/1984 | Saur et al. . |
| 4,474,287 | 10/1984 | Thompson . |
| 4,643,299 | 2/1987 | Calundan ............... 198/812 |
| 4,813,526 | 3/1989 | Bélanger . |
| 4,946,027 | 8/1990 | Jenkins . |
| 5,009,560 | 4/1991 | Ruder et al. . |
| 5,046,603 | 9/1991 | Odenthal ............... 198/812 |
| 5,067,867 | 11/1991 | Ruder et al. . |
| 5,193,660 | 3/1993 | McKernan et al. . |
| 5,203,442 | 4/1993 | Oury et al. ............ 198/812 X |

*Primary Examiner*—D. Glenn Dayoan
*Attorney, Agent, or Firm*—Price, Heneveld, Cooper, DeWitt & Litton

[57] ABSTRACT

An extendable conveyor for conveying product having a base unit, at least two extendable units selectively nested within each other and the base unit and a conveying member supported by the base unit and any extended portions of the extendable units, each of the extendable units is supported by a cantilever support system from the next most inward extendable unit or the base unit, the cantilever support system for each extendable unit including at least one rearward support member on each extendable unit engaging the next most inward extendable unit or the base unit and at least one forward support member on the next most inward extendable unit of the base unit supporting the extendable unit, at least the rearward support members or the forward support members being laterally aligned in a vertical plane adjacent a lateral perimeter of the conveying member in order to allow a reduced range in width of the extendable units and thereby a wider conveying surface relative to the width of the base unit.

39 Claims, 10 Drawing Sheets

MULTIPLE-STAGE EXTENDABLE CONVEYOR

BACKGROUND OF THE INVENTION

This invention relates generally to belt conveyors and, more particularly, to an extendable conveyor having a base unit, at least two extendable units selectively nested within each other and the base unit, and a conveying member supported by the base unit and any extended portions of the extendable units.

Extendable conveyor units are useful for loading and unloading trailer trucks in order to deliver or retrieve the product at any desired point of the trailer. Such a unit is disclosed in U.S. Pat. No. 3,835,980 issued to Brooks, Jr. for a CONVEYOR WITH EXTENDABLE BOOMS. One important rating of an extendable conveyor is the ratio of the width of the conveying member, such as a driven belt, to the overall width of the stationary base unit. Because each extendable unit, or boom, must be narrower than the next innermost extendable unit, the width of the most remote unit dictates the width of the belt which may be accommodated. Because each extendable unit is cantilevered from the prior unit, the support for each extendable unit must be efficient in order to avoid taking up excessive space and, thus, reducing the width of each extendable unit. Another important rating is the ratio of the fully extended length to the fully retracted length of the conveyor. This results from a desire to minimize the intrusion of the conveyor when it is not in use while maximizing the extended length into the trailer. All of this must be accomplished while providing adequate support at the remote end of a fully extended conveyor with minimum vertical deflection under rated loading. It is further desirable to provide such an extendable conveyor in which the base unit may itself be pivotally adjustable in order to provide vertical adjustability of the remote end of the conveyor.

SUMMARY OF THE INVENTION

The present invention is intended to provide an extendable conveyor which provides a significant improvement over the performance of previously proposed conveyors with extendable booms. In particular, the present invention is intended to provide a superior ratio of conveying belt width to width of the base unit and extended conveyor length to retracted conveyor length. This is accomplished in a manner which provides exceptionally stable vertical support of loads at the remote end of the conveyor even in a fully extended position. The present invention is embodied in an extendable conveyor for conveying product and having a base unit, at least two extendable units selectively nested within each other and the base unit, and a conveying member supported by the base unit and any extended portions of the extendable units. The extendable units may be longitudinally adjustably positioned incrementally between fully nested positions within the base unit or the next most inward extendable unit and a fully extendable position telescoped outwardly from the base unit and from one another. Each of the extendable units is supported by a cantilevered support system from the next most inward extendable unit or the base unit. The can ti levered support system for each of the extendable units includes at least one rearward support member on each extendable unit engaging the next most inward extendable unit or the base unit. The support system further includes at least one forward support member for supporting each extendable unit that is on the next most inward extendable unit or the base unit. According to one aspect of the invention, either or both of the rearward support members and the forward support members are laterally aligned in a vertical plane that is adjacent a lateral perimeter of the conveying member. This allows a reduced range in width of the extendable units and thereby a wider conveying surface relative to the width of the base unit.

According to another aspect of the invention, each forward support member may include a rotatable support roller below a portion of the supported extendable unit, a support block for mounting the support roller and a low-friction wear strip lateral of a portion of the extendable unit. This particular structure may be accommodated in an exceptionally narrow lateral width and thereby is exceptionally efficient in space utilization. Each rearward support member may include a rotatable support roller engaging the next most inward extendable unit or base unit and a vertical adjustment mechanism mounting the support roller to the supported extendable unit. This provides for alignment of the extendable units.

According to another aspect of the invention, the rotatable support roller is below a turned portion of the supported extendable unit and the low-friction wear strip is lateral of the turned portion of the extendable unit for laterally restraining the turned portion. In a preferred embodiment, the low-friction wear strip is mounted by the support block and the turned end portions of the extendable unit includes a riding strip engaged from beneath by the roller and laterally by the low-friction wear strip.

A further aspect of the invention is embodied in such an extendable conveyor in which the conveying member is a driven belt supported by support rolls on each of the extendable units and the base unit. According to this aspect of the invention, an adjustable belt tracking mechanism is provided on at least one end of particular support rolls. The belt tracking mechanism has a lateral dimension that is no greater than that of the rearward support members and forward support members, whereby the belt tracking mechanism does not add to the width of the extendable units. According to this aspect of the invention, the adjustable belt tracking mechanism may include an eccentric cam member between a shaft on the support roll and a fixed location on the extendable unit or base unit supporting that shaft. The belt tracking mechanism may further include an engagement member on the cam member adapted to capturing a hand tool to thereby directly rotate the cam to adjust belt tracking.

A further aspect of the invention may be embodied in such an extendable conveyor that is pivotally supported at a pivot point at one end thereof and including means for selectively vertically positioning the other end thereof with respect to a support surface. According to this further aspect of the invention, a horizontal stabilizer between the other end of the extendable conveyor and the support surface is provided to resist lateral loads on the extendable conveyor irrespective of the vertical position of the other end.

Yet, a further aspect of the invention is embodied in such a pivotally supported base unit wherein the conveying surface is a driven belt supported by support rolls on each of the extendable units and the base unit. According to this aspect of the invention, the pivot is coaxial with one of the support rolls, preferably the upper, rearward support roll of the base unit. In this manner, the base unit may be pivotally vertically adjustable while maintaining a close spacing between the conveying belt of the extendable conveyor and the conveying surface of the conveyor unit feeding product to, or retrieving product from, the extendable conveyor.

These and other objects, advantages and features of this invention will become apparent upon review of the following specification in conjunction with the drawings.

BRIEF DESCRIPTION OF THE DRAWINGS

FIG. 3 is an enlarged view of the area illustrated at III in FIG. 2a;

FIG. 4 is an enlarged view of the area designated IV in FIG. 2a;

DESCRIPTION OF THE PREFERRED EMBODIMENT

Figure 1:
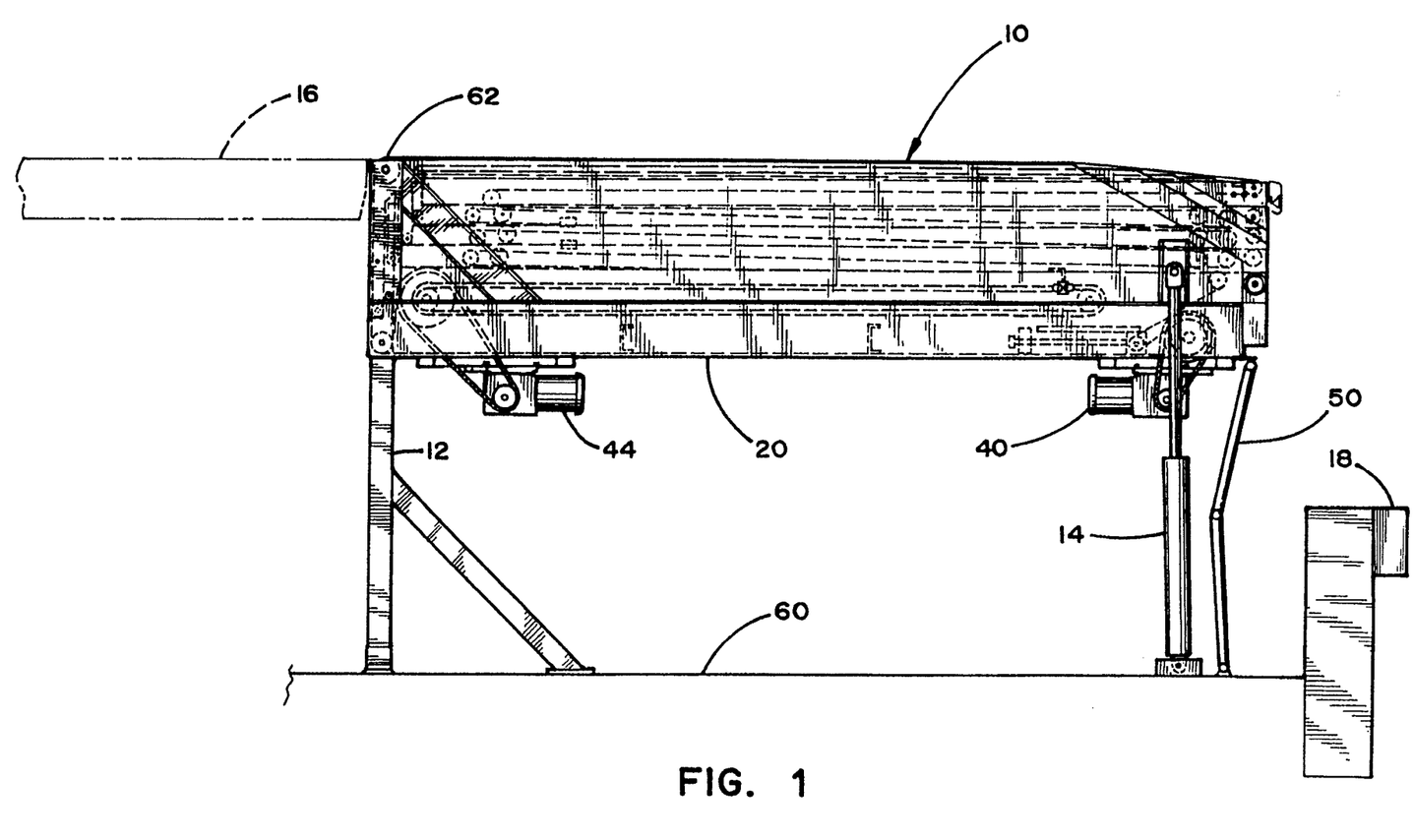
FIG. 1 is a side elevation of an extendable conveyor according to the invention in a fully retracted position, with portions removed in order to reveal internal structure.

Referring now specifically to the drawings, and illustrative embodiments depicted therein, a multiple-stage extendable conveyor 10 is supported adjacent a feed or take-away conveyor 16 rearwardly by a rear vertical support 12 and forwardly by an adjustable vertical support 14 (FIG. 1 ). Extendable conveyor 10 is positioned at a loading/unloading dock illustrated by a truck bumper 18, whereby the extendable conveyor 10 may be used to load and unload a truck (not shown) parked against bumper 18.

Figure 2A:
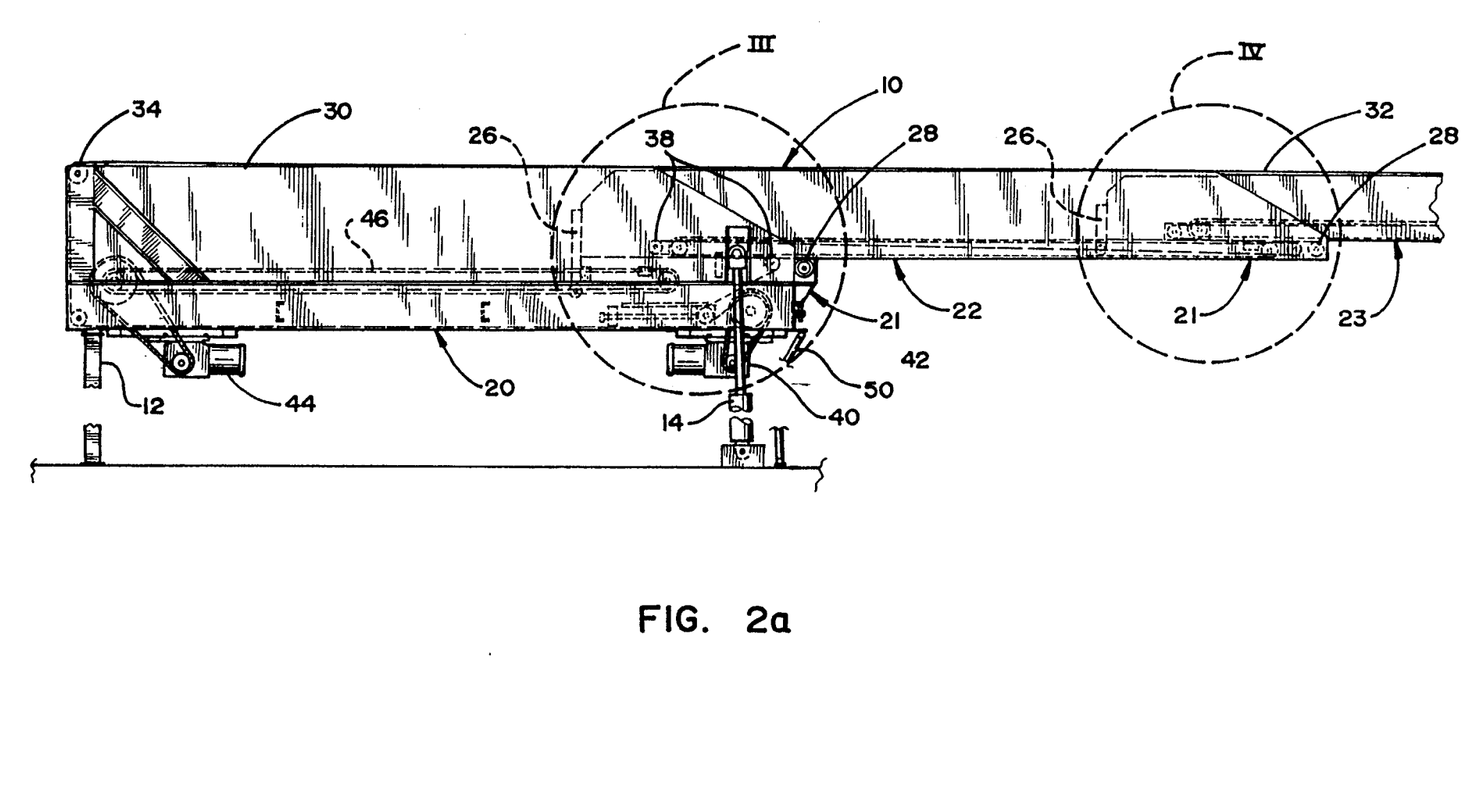
FIGS. 2a and 2b are the same view as FIG. 1 of the extendable conveyor in a fully extended position.
Figure 2B:
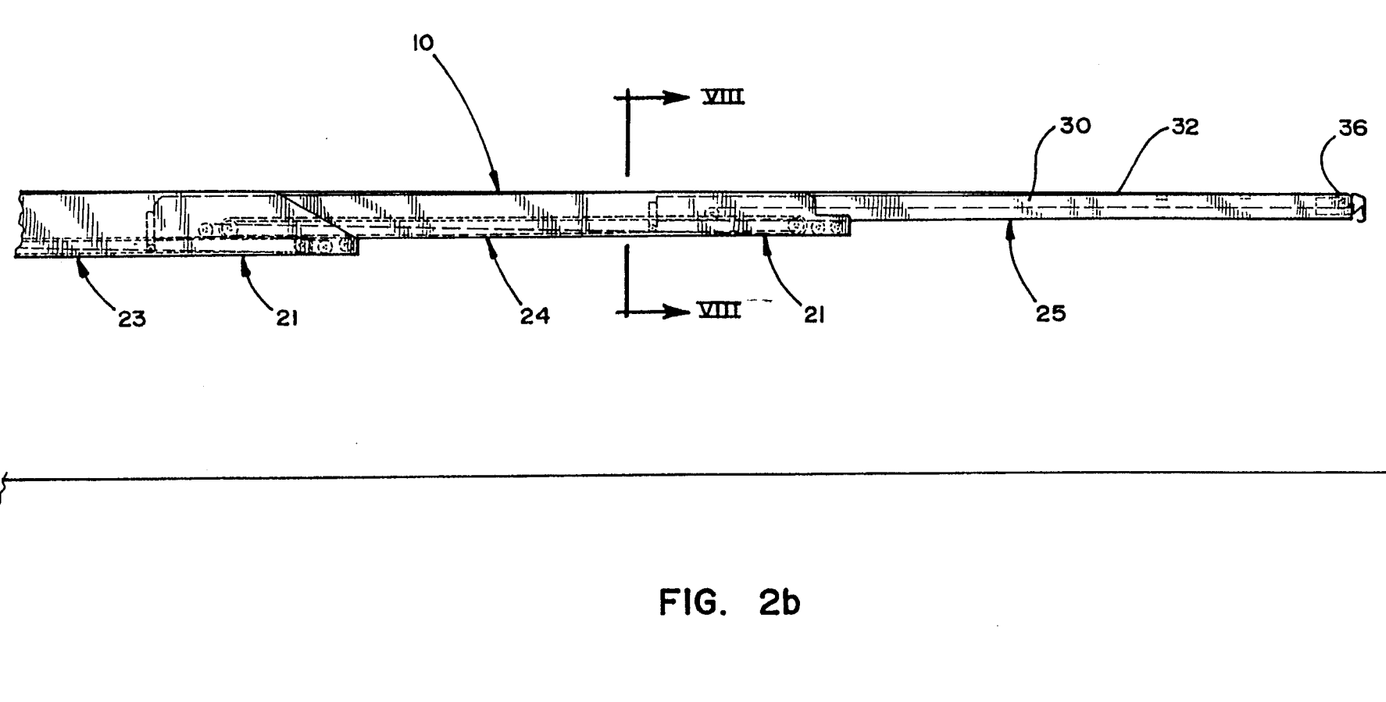
Figure 3:
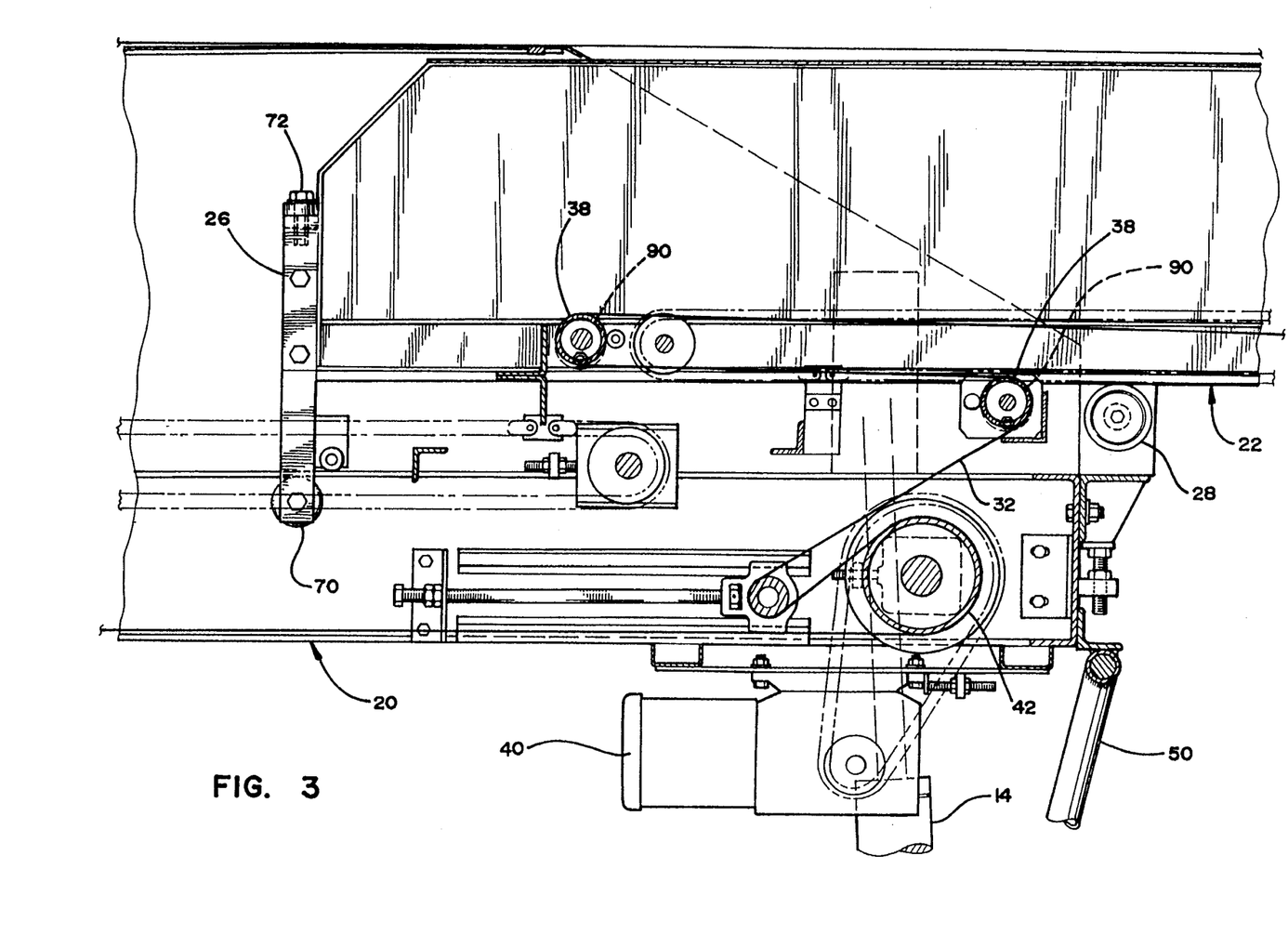
Figure 4:
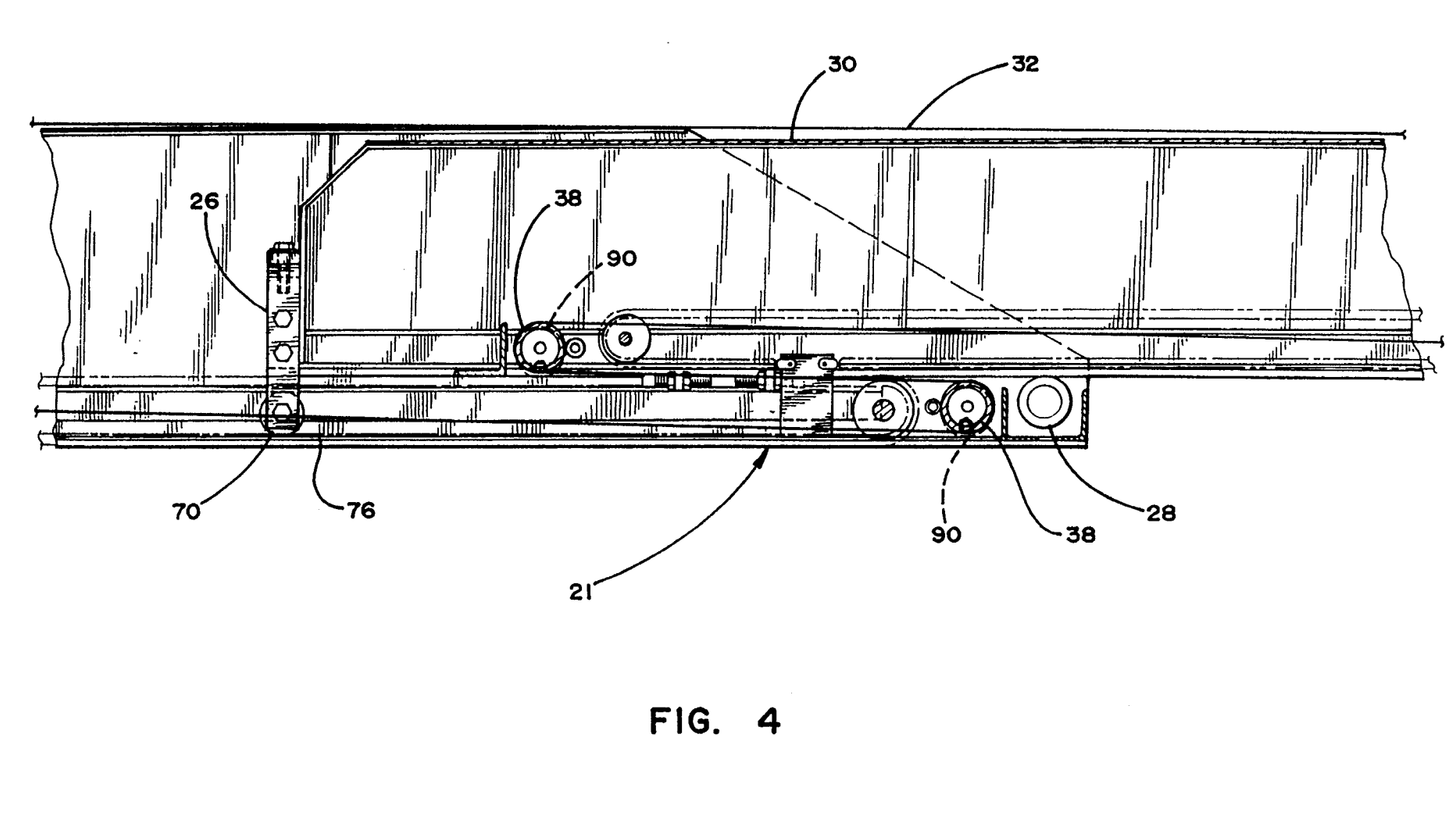

Extendable conveyor 10 includes a stationary base unit 20, a first extendable unit 22, a second extendable unit 23, a third extendable unit 24 and a fourth, remote, extendable unit 25 (FIGS. 2a and 2b). Extendable units 23–25 are each cantilever-supported by the next most inward extendable unit and first extendable unit 22 is cantilever-supported by base unit 20. Each of the extendable units is supported by a support system, generally shown at 21, made up of a pair of rearward support members 26, which are mounted to the supported extendable unit and engage the next most inward extendable unit or the base unit, and a pair of forward support members 28 which are mounted to the base unit or the next most inward extendable unit (FIG. 4). Each of the base unit 20 and extendable units 22–25 includes an upper support surface 30 to support a conveying member, such as a conveyor belt 32. Conveyor belt 32 is reeved over a rearward support roll 34 at the upper rear of base unit 20, a forward upper support roll 36 at a remote end of remote extendable unit 25 and a series of intermediate support rolls 38 positioned at rearward and forward lower portions of each of the extendable units, whereby the conveyor belt may be under proper tension irrespective of the extended length of extendable conveyor 10, as is well known in the art. A drive motor 40 and drive roll 42 provide motive means in order to propel conveyor belt 32.

The extendable units 22–25 may be selectively extended and retracted in unison in order to adjust the extended length of conveyor 10 by any suitable extension system, such as that disclosed in Brooks, Jr. U.S. Pat. No. 3,835,980, the disclosure of which is hereby incorporated herein by reference. Such extension system may be operated from a bi-directional motor 44 driving a chain 46 on base unit 20 in order to extend the first extendable unit 22 which, in turn, drives a chain (not shown) on extendable unit 22 in order to extend unit 23. This scheme may be carried out along each of the extendable units in order to extend each unit in unison with the unit before it, as is well known in the art.

Figure 6:
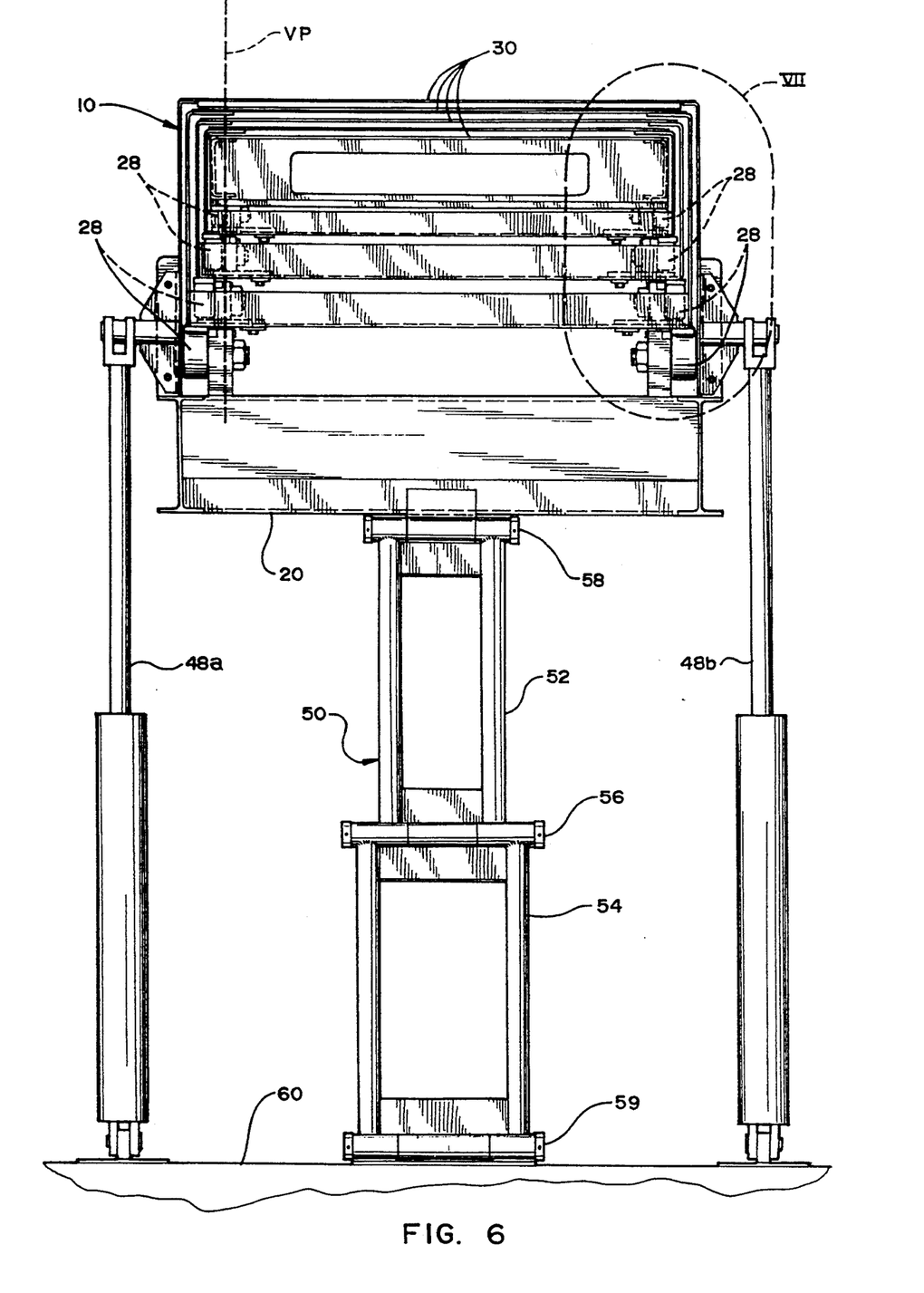
FIG. 6 is a front elevation of the extendable conveyor in FIG. 1.

Adjustable vertical support 14 is composed of a pair of coordinated hydraulic cylinders 48a and 48b, and a horizontal stabilizer 50 (FIG. 6). Although hydraulic cylinders 48a and 48b are coordinated in order to provide horizontally stable vertical adjustability to the remote point of extendable conveyor 10, horizontal stabilizer 50 is provided in order to ensure that upper support surface 30 is level in the lateral sense for all positions of vertical support 14. Horizontal stabilizer 50 includes first and second frame portions 52, 54, which are pivotally joined together at 56. First frame portion 52 is, in turn, pivotally joined to base unit 20 at 58 and second frame portion 54 is pivotally joined at 59 with a support surface, such as floor 60. Base unit 20 is pivotally supported at 62 with rear vertical support 12 (FIG. 1). Pivot 62 is coaxial with the axis of rotation of rearward support roll 34. This location minimizes any gap that may exist between conveyor belt 32 and feed/-takeaway conveyor 16 irrespective of the vertical position of the vertical support 14 of extendable conveyor 10.

Figure 5:
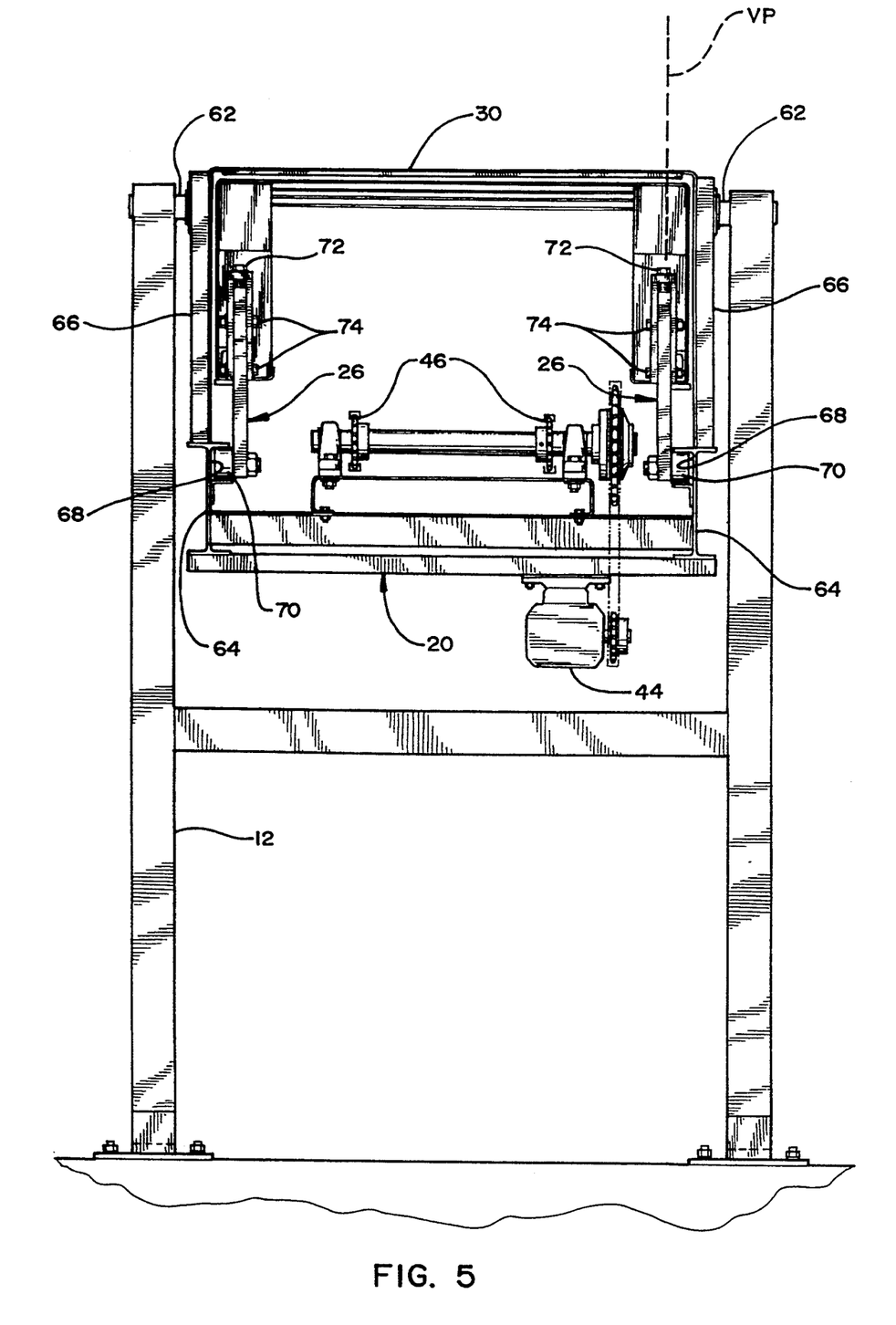
FIG. 5 is a rear elevation of the extendable conveyor in FIG. 1.

Base unit 20 includes a pair of lower support beams 64 and a pair of side plates 66 supporting its upper support surface 30 from support beams 64 (FIG. 5). Support beams 64 define a guide track at 68 in which rollers, such as cam followers 70, of the rearward support unit 26 of first extendable unit 22 are guided. Each rearward support unit 26 is vertically adjustable with a vertical adjustment mechanism 72, the adjustable position of which may be locked with locking members 74. Each of extendable units 22–25, in a similar fashion, is composed of a pair of structural members, namely support angles 76, connected by sides 78 with their respective upper support surface 30 (FIG. 8). Each pair of support angles 76 guide the rearward support unit 26 of the next most outward extendable unit. Support angles 76 are connected together for each extendable unit at forward and rearward portions by spaced horizontal struts (not shown). Support channels 76 terminate forwardly immediately behind each forward support unit 28 and are, therefore, not visible in FIGS. 6 and 7.

Figure 7:
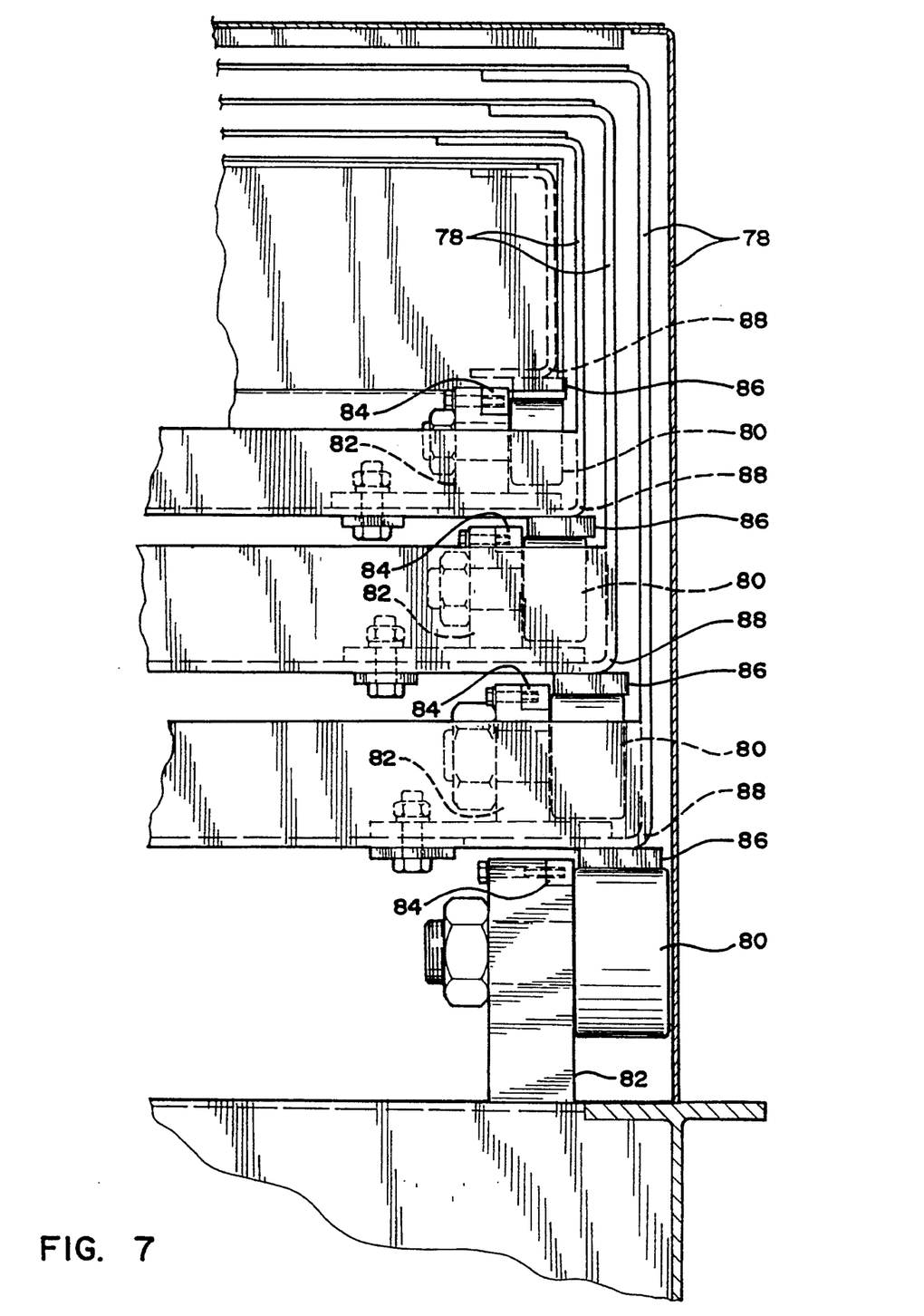
FIG. 7 is an enlarged view of the area designated VII in FIG. 6.
Figure 8:
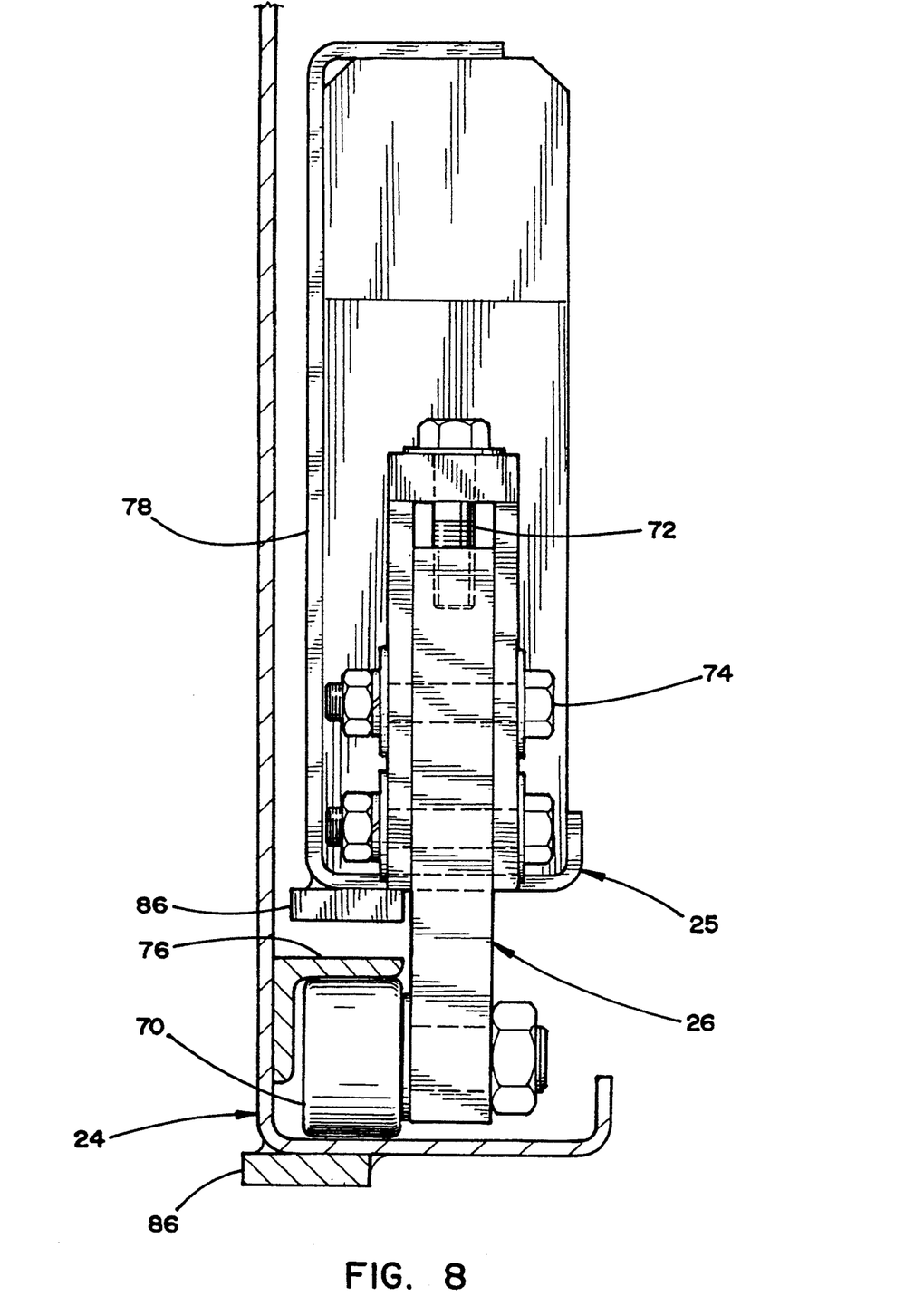
FIG. 8 is a partial sectional view taken along the line VIII—VIII in FIG. 2b.

Each forward support unit 28 is mounted forwardly on the base unit 20 or the next most inward extendable units 22–24 (FIGS. 6 and 7). Each forward support unit 28 includes a support roller, such as a cam follower 80, a support block 82 for rotatably mounting cam follower 80 and a replaceable low-friction wear strip 84, which supports and laterally guides a lower inwardly turned portion 88 of the side 78 of the supported extendable units 22-25. In the illustrated embodiment, wear strip 84 is an oil-impregnated bronze although other materials may be used. A riding strip 86 is mounted at each inwardly turned portion 88 of the supported extendable unit. Each riding strip 86 is vertically supported by the cam follower 80 and is laterally guided by wear strip 84. As may be best seen by reference to FIGS. 5 and 6, forward support units 28 at each side of each expandable unit are laterally aligned in a vertical plane designated VP. Plate VP is closed to the later perimeter edge (not shown) of conveyor belt 32. This provides exceptionally efficient space utilization because sides 78 may be closely spaced and thereby allow minimum reduction in the width of upper support surface 30 at points more remote from base unit 20. This increases the potential ratio of the width of conveyor belt 32 to the width of base unit 20 over prior designs. Likewise, rearward support units 26 at each side of each extendable unit 22-25 are laterally aligned with vertical plane VP. Rearward support units 26 for extendable units 23-25 are not visible in FIG. 5 because they are covered by the rearward support units for extendable unit 22.

Figure 9A:
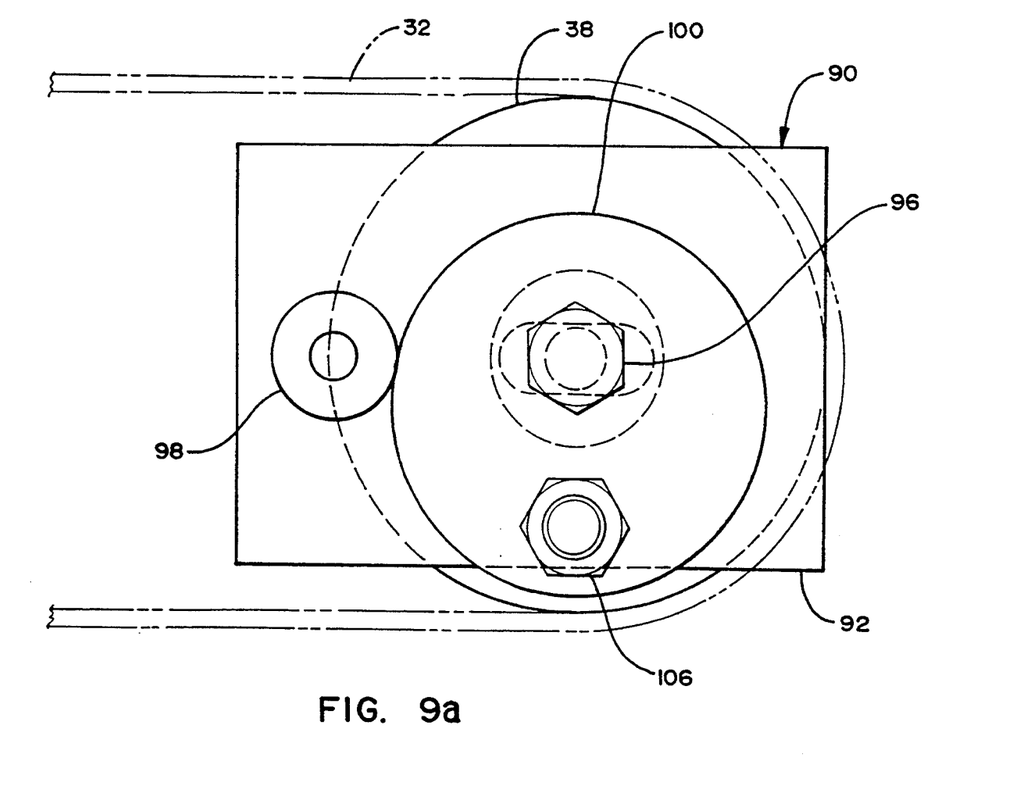
FIGS. 9a, 9b and 9c are side elevations of a belt tracking adjuster according to the invention and components of the adjustment mechanism.
Figures 9B, 9C:
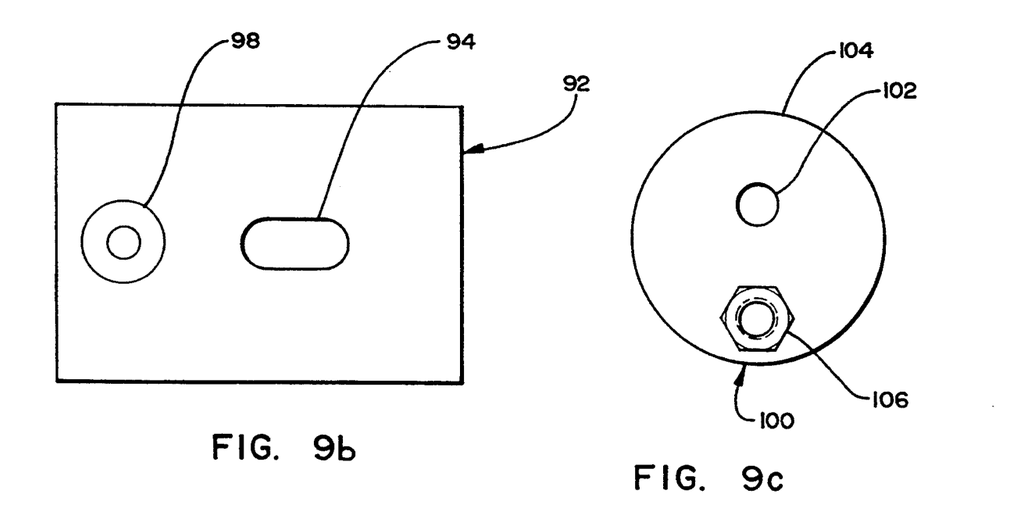

Each intermediate support roll 38 may be adjusted for proper tracking of conveyor belt 32 by a belt tracking adjustment member 90 (FIGS. 9a, 9b and 9c). Each belt tracking adjustment member 90 is within the lateral dimension of the forward support units 28 and, therefore, does not add to the width of each extendable unit 22-25. Because each of the intermediate support rolls forward on each of the extendable units is positioned behind the associated forward support unit, the belt tracking adjustment members 90 are not visible in FIGS. 6 and 7. Each such belt tracking adjustment member 90 includes a stationary plate 92 having a slotted opening 94 for receiving shaft 96 of the associated intermediate support roll 38 and a stationary shoulder member 98. Each belt tracking adjustment member 92 includes an adjuster 100 having an opening 102, which pivots about support shaft 96, and a peripheral camming surface 104, which engages shoulder member 98. Adjuster 100 further includes a hex nut 106 welded thereto and adapted to be engaged by a hand tool, such as a thin open-ended wrench. Belt tracking adjustment member 98 is manually operated by a wrench being placed on hex nut 106 and a downward thrust being placed upon the opposite end of the wrench. This causes adjuster 100 to rotate clockwise around shaft 96 causing shoulder member 98 to force against camming surface 104 and thereby imparting a movement on shaft 96 tending to tighten belt 32. When the belt has been properly tracked in this fashion, shaft 96 is locked in place. In order to loosen the belt at adjustment member 90, the mechanic need only to let-up on the wrench in order to cause shaft 96 to move inward. Belt 92 will tend to rotate adjuster 100 counterclockwise around shaft 96 thereby loosening that portion of the belt.

Because of the unique configuration of an extendable conveyor provided according to the invention, a belt conveyor having a width of greater than 24 inches is possible in order to accommodate parcels of significant size without an undue girth of base unit 20. This is accomplished in a unique manner while providing exceptional stability to the vertical support of the conveying surface. A four-unit extendable conveyor, tested under simulated loading conditions, was found to vertically deflect less than one-half inch for 500 pounds loading placed at the remote end of a fully extended conveyor. Furthermore, by providing a horizontal stabilizer, such exceptional support stability may be provided for all orientations of extendable conveyor 10. In addition, gaps between conveyor belt 32 and the conveying surface of feed/take-away conveyor 16 may be kept to a minimum by the unique placement of the pivot for base unit 20.

Changes and modifications in the specifically described embodiments can be carried out without departing from the principles of the invention. For example, although the invention is illustrated as having four extendable units, its principles may be applied to a fewer or greater number of extendable units. The protection afforded the invention is intended to be limited only by the scope of the appended claims, as interpreted according to the principles of patent law including the Doctrine of Equivalents.

The embodiments of the invention in which an exclusive property or privilege is claimed are defined as follows:

1. In an extendable conveyor for conveying product, said extendable conveyor having a base unit, at least two extendable units selectively nested within each other and said base unit and a conveying member supported by said base unit and any extended portions of said extendable units, wherein said extendable units may be adjustably positioned incrementally between fully nested positions within said base unit or the next most inward extendable unit and fully extended position telescoped outwardly from said base unit and from one another, and further wherein each of said extendable units is supported by a cantilever support system from the next most inward extendable unit or said base unit, the improvement comprising:

said cantilever support system for each extendable unit including at least one rearward support member on each extendable unit engaging the next most inward extendable unit or the base unit and at least one forward support member on the next most inward extendable unit or the base unit supporting the extendable unit; and wherein at least said rearward support members or said forward support members being laterally aligned in a vertical plane adjacent a lateral perimeter of said conveying member in order to allow a reduced range in width of said extendable units and thereby a wider conveying surface relative to the width of said base unit.

2. The extendable conveyor in claim 1 including a pair of said rearward support members on each extendable unit and a pair of said forward support members of the next most inward extendable unit or the base unit and wherein at least said rearward support members or said forward support members are laterally aligned in a pair of vertical planes adjacent lateral perimeters of said conveying member.

3. The extendable conveyor in claim 2 wherein both said forward support members and said rearward support members are laterally aligned in said pair of vertical planes.

4. The extendable conveyor in claim 1 wherein both said forward support members and said rearward support members are laterally aligned in said vertical plane.

5. The extendable conveyor in claim 1 wherein at least one of said forward support members and said rearward support members are vertically adjustable in order to align said extendable units.

6. The extendable conveyor in claim 1 wherein said conveying member is a driven belt supported by support rolls on each of said extendable units and said base unit and further including an adjustable belt tracking mechanism on at least one end of at least one of said support rolls, said belt tracking mechanism having a lateral dimension that is no greater than that of said rearward support members or forward support members.

7. The extendable conveyor in claim 6 wherein said adjustable belt tracking mechanism includes an eccentric cam member between a shaft on said one of said support rolls and a fixed location on the extendable unit or base unit supporting that shaft and an engagement member on said cam member adapted to capturing a hand tool to thereby directly rotate said cam.

8. The extendable conveyor in claim 7 wherein said engagement member is a nut attached to the cam member.

9. The extendable conveyor in claim 7 wherein said cam member rotates about said shaft.

10. The extendable conveyor in claim 1 wherein said base unit is pivotally supported at a pivot at one end thereof and includes means for selectively vertically positioning the other end of said base unit with respect to a support surface.

11. The extendable conveyor in claim 10 further including a horizontal stabilizer between said other end of said base unit and said support surface to resist lateral loads on said extendable conveyor irrespective of the vertical position of said other end of said base unit.

12. The extendable conveyor in claim 11 wherein said horizontal stabilizer includes a pair of frame members that are pivotally joined together at one end thereof and wherein the other end of one of said frame members is pivotally joined to said base unit and the other end of the other of said frame member is pivotally joined to said support surface.

13. The extendable conveyor in claim 10 wherein said conveying member is a driven belt supported by support rolls on each of said extendable units and said base units and wherein said pivot is coaxial with one of said support rolls.

14. The extendable conveyor in claim 1 including more than two of said extendable units.

15. An extendable conveyor comprising:
a base unit, at least two extendable units selectively nested within each other and said base unit and a conveying member supported by said base unit and any extended portions of said extendable units, wherein said extendable units may be adjustably positioned incrementally between fully nested positions within said base unit or the next most inward extendable unit and fully extended position telescoped outwardly from said base unit and from one another;
a cantilever support for supporting each extendable unit from the next most inward extendable unit or said base unit including at least one rearward support member on the extendable unit engaging the next most inward extendable unit or the base unit and at least one forward support member on the next most inward extendable unit or the base unit supporting the extendable unit; and
each said forward support member including a rotatable support roller below a portion of the supported extendable unit, a support block for mounting the support roller and a low-friction wear strip lateral of a portion of the supported extendable unit.

16. The extendable conveyor in claim 10 wherein said low-friction wear strip is mounted by said support block.

17. The extendable conveyor in claim 15 wherein each said extendable unit includes a top for supporting the conveying member, a pair of sides extending downwardly from said top and terminating in turned end portions engaged by said roller and said low-friction wear strip.

18. The extendable conveyor in claim 17 wherein each of said turned end portions includes a riding strip engaged from beneath by said roller and laterally by said low-friction wear strips.

19. The extendable conveyor in claim 18 wherein said low-friction wear strip is mounted by said support block.

20. The extendable conveyor in claim 15 wherein each said rearward support member includes a rotatable support roller engaging the next inward extendable unit or the base unit and a vertical adjustment mechanism mounting the support roller to the supported extendable unit.

21. The extendable conveyor in claim 15 wherein said conveying member is a driven belt supported by support rolls on each of said extendable units and said base unit and further including an adjustable belt tracking mechanism on at least one end of at least one of said support rolls, said belt tracking mechanism having a width that is no greater than said rearward support members and said forward support members.

22. The extendable conveyor in claim 21 wherein said adjustable belt tracking mechanism includes an eccentric cam member between a shaft on said one of said support rolls and a fixed location on the extendable unit or base unit supporting that shaft and an engagement member on said cam member adapted to capturing a hand tool to thereby directly rotate said cam.

23. The extendable conveyor in claim 22 wherein said engagement member is a nut attached to the cam member.

24. The extendable conveyor in claim 22 wherein said cam member rotates about said shaft.

25. The extendable conveyor in claim 15 wherein said base unit is pivotally supported at a pivot at one end thereof and includes means for selectively vertically positioning the other end of said base unit with respect to a support surface.

26. The extendable conveyor in claim 25 further including a horizontal stabilizer between said other end of said base unit and said support surface to resist lateral loads on said extendable conveyor irrespective of the vertical position of said other end of said base unit.

27. The extendable conveyor in claim 26 wherein said horizontal stabilizer includes a pair of frame members that are pivotally joined together at one end thereof and wherein the other end of one of said frame members is pivotally joined to said base unit and the other end of the other of said frame member is pivotally joined to said support surface.

28. The extendable conveyor in claim 25 wherein said conveying member is a driven belt supported by support rolls on each of said extendable units and said base units and wherein said pivot is coaxial with one of said support rolls.

29. The extendable conveyor in claim 15 including more than two of said extendable units.

30. An extendable conveyor comprising:

a base unit, at least two extendable units selectively nested within each other and said base unit and a conveying member supported by said base unit and any extended portions of said extendable units, wherein said extendable units may be adjustably positioned incrementally between fully nested positions within said base unit or the next most inward extendable unit and fully extended position telescoped outwardly from said base unit and from one another;

each said extendable unit includes a top for supporting the conveying member, a pair of sides extending downwardly from said top and terminating in turned end portions;

a cantilever support for supporting each extendable unit from the next most inward extendable unit or said base unit including a pair of rearward support members on the supported extendable unit engaging the next most inward extendable unit or the base unit and a pair of forward support members on the next most inward extendable unit or the base unit supporting the extendable unit, wherein the forward support members being laterally aligned in a pair of vertical planes adjacent lateral perimeters of said conveying member in order to allow a reduced range in width of said extendable unit and thereby a wider conveying surface relative to the width of said base unit; and each said forward support member including a rotatable support roller below the turned portion of the supported extendable unit, a support block for mounting the support roller and a low-friction wear strip lateral of the turned portion of the extendable unit for laterally restraining the turned portion.

31. The extendable conveyor in claim 30 wherein said low-friction wear strip is mounted by said support block.

32. The extendable conveyor in claim 30 wherein each of said turned end portions includes a riding strip engaged from beneath by said roller and laterally by said low-friction wear strip.

33. The extendable conveyor in claim 30 wherein each said extendable unit includes elongated horizontal structural members engaged by the rearward support members of the supported extendable unit.

34. The extendable conveyor in claim 33 wherein said rearward support members include support rollers engaged by the corresponding said structural members.

35. The extendable conveyor in claim 30 wherein each said rearward support member includes a rotatable support roller engaging the next most inward extendable unit or the base unit and a vertical adjustment mechanism mounting the support roller to the supported extendable unit.

36. The extendable conveyor in claim 30 wherein said conveying member is a driven belt supported by support rolls on each of said extendable units and said base unit and further including an adjustable belt tracking mechanism on at least one end of at least one of said support rolls, said belt tracking mechanism having a width that is no greater than said rearward support members and said forward support members.

37. The extendable conveyor in claim 36 wherein said adjustable belt tracking mechanism includes an eccentric cam member between a shaft on said one of said support rolls and a fixed location on the extendable unit or base unit supporting that shaft and an engagement member on said cam member adapted to capturing a hand tool to thereby directly rotate said cam.

38. The extendable conveyor in claim 37 wherein said engagement member is a nut attached to the cam member.

39. The extendable conveyor in claim 37 wherein said cam member rotates about said shaft.

* * * * *